United States Patent
Johanning et al.

(10) Patent No.: US 10,876,649 B2
(45) Date of Patent: Dec. 29, 2020

(54) MANUFACTURE OF REMOTE CONTROL STATIONS FOR USE TO OPERATE ACTUATORS ON A VALVE ASSEMBLY

(71) Applicant: Dresser LLC, Addison, TX (US)

(72) Inventors: Jeffrey Louis Johanning, Ponte Vedra, FL (US); Kyle McKinley Bryan, Jacksonville, FL (US); Mark David Kaczmarek, Middleburg, FL (US); Abdul Raoof Mohamed, Jacksonville, FL (US); Jayesh K Shah, Palantine, IL (US)

(73) Assignee: Dresser, LLC, Houston, TX (US)

( * ) Notice: Subject to any disclaimer, the term of this patent is extended or adjusted under 35 U.S.C. 154(b) by 218 days.

(21) Appl. No.: 16/039,430

(22) Filed: Jul. 19, 2018

(65) Prior Publication Data

US 2019/0032810 A1    Jan. 31, 2019

Related U.S. Application Data

(60) Provisional application No. 62/536,778, filed on Jul. 25, 2017, provisional application No. 62/560,956, filed on Sep. 20, 2017.

(51) Int. Cl.
*F16K 31/12* (2006.01)
*G05D 7/06* (2006.01)
*F15B 1/00* (2006.01)

(52) U.S. Cl.
CPC ............. *F16K 31/12* (2013.01); *F15B 1/00* (2013.01); *G05D 7/0641* (2013.01); *Y10T 137/6851* (2015.04)

(58) Field of Classification Search
CPC . Y10T 137/6851; F15B 13/0825; F16K 31/12
USPC .................. 248/49–74.5, 80–88, 121–125.9
See application file for complete search history.

(56) References Cited

U.S. PATENT DOCUMENTS

| | | | |
|---|---|---|---|
| 3,034,844 A | 5/1962 | Anderson et al. | |
| 3,751,127 A | 8/1973 | Black, Jr. et al. | |
| 3,923,161 A | 12/1975 | Kaiser et al. | |
| 4,008,931 A | 2/1977 | Kennedy, Jr. et al. | |
| 4,297,966 A | 11/1981 | Liberman | |

(Continued)

FOREIGN PATENT DOCUMENTS

| | | |
|---|---|---|
| CN | 203537692 U | 4/2014 |
| CN | 203637953 U | 6/2014 |

(Continued)

OTHER PUBLICATIONS

International Search Report and Written Opinion issued in connection with corresponding PCT Application No. PCT/US2018/043210 dated Oct. 22, 2018.

*Primary Examiner* — Kevin F Murphy
(74) *Attorney, Agent, or Firm* — Paul Frank + Collins P.C.

(57) ABSTRACT

A control assembly that is configured to operate large, heavy duty flow controls. The control assembly may include a main support and a thin plate disposed on the main support, the thin plate having four sides forming a mounting surface, the thin plate also having lateral slots that extend lengthwise in a first direction between two of the sides and are arranged so adjacent lateral slots are spaced apart from one another in a second direction perpendicular to the first direction.

20 Claims, 9 Drawing Sheets

(56) References Cited

U.S. PATENT DOCUMENTS

| | | | | |
|---|---|---|---|---|
| 4,352,532 A | * | 10/1982 | Hardin | H01R 13/74 137/269 |
| 4,372,410 A | | 2/1983 | Loken et al. | |
| 4,708,160 A | | 11/1987 | Sharp et al. | |
| 5,046,789 A | | 9/1991 | Lee | |
| 5,088,571 A | | 2/1992 | Burry et al. | |
| 5,257,583 A | | 11/1993 | Koenig | |
| 5,364,159 A | | 11/1994 | Kelman et al. | |
| 5,484,221 A | | 1/1996 | Decoux | |
| 5,738,140 A | | 4/1998 | Mann | |
| 5,810,031 A | * | 9/1998 | Evans | C23C 16/4401 137/557 |
| 5,823,602 A | | 10/1998 | Kelman et al. | |
| 6,076,543 A | * | 6/2000 | Johnson | C23C 16/54 137/15.17 |
| 6,484,747 B2 | * | 11/2002 | Bridgers | A61M 16/08 128/204.18 |
| 6,536,614 B2 | | 3/2003 | Hsia et al. | |
| 6,560,106 B2 | | 5/2003 | Ivey et al. | |
| 6,609,336 B2 | | 8/2003 | Matsubara | |
| 6,843,543 B2 | | 1/2005 | Ramesh | |
| 7,039,965 B1 | * | 5/2006 | Ismert | E03C 1/021 248/56 |
| 7,265,966 B2 | | 11/2007 | Dudley | |
| 8,003,899 B2 | | 8/2011 | Wenlong et al. | |
| 8,142,705 B2 | | 3/2012 | Breest et al. | |
| 8,850,748 B2 | | 10/2014 | Zimmermann et al. | |
| 9,109,354 B2 | | 8/2015 | Toubia et al. | |
| 9,482,780 B2 | | 11/2016 | Haas et al. | |
| 9,502,874 B2 | * | 11/2016 | Gagne | H02G 3/086 |
| 2005/0067180 A1 | | 3/2005 | Dinh | |
| 2010/0128448 A1 | | 5/2010 | Wenlong | |
| 2010/0242645 A1 | | 9/2010 | McIlroy et al. | |
| 2012/0006425 A1 | * | 1/2012 | Hayashi | F16L 3/1066 137/343 |
| 2012/0192964 A1 | * | 8/2012 | Shikata | F16L 3/221 137/343 |
| 2012/0255710 A1 | | 10/2012 | Maselli et al. | |
| 2012/0310119 A1 | * | 12/2012 | Salo Darder | A61H 9/005 601/6 |
| 2014/0109990 A1 | | 4/2014 | Brashear | |
| 2015/0184772 A1 | | 7/2015 | Inagaki et al. | |
| 2016/0238349 A1 | | 8/2016 | White et al. | |

FOREIGN PATENT DOCUMENTS

| | | |
|---|---|---|
| JP | 3899123 B2 | 3/2007 |
| JP | 5972294 B2 | 7/2016 |
| JP | 2016-148436 A | 8/2016 |

* cited by examiner

US 10,876,649 B2

MANUFACTURE OF REMOTE CONTROL STATIONS FOR USE TO OPERATE ACTUATORS ON A VALVE ASSEMBLY

CROSS-REFERENCE TO RELATED APPLICATIONS

This application claims the benefit of U.S. Ser. No. 62/536,778, filed on Jul. 25, 2017, and entitled "IMPROVING MANUFACTURE OF REMOTE CONTROL STATIONS FOR USE TO OPERATE ACTUATORS ON A VALVE ASSEMBLY," and to U.S. Ser. No. 62/560,956, filed on Sep. 20, 2017, and entitled "IMPROVING MANUFACTURE OF REMOTE CONTROL STATIONS FOR USE TO OPERATE ACTUATORS ON A VALVE ASSEMBLY." The content of these applications is incorporated by reference herein in its entirety.

BACKGROUND

Flow controls are important in many industries. Whether found on process lines, gas distribution networks, or other systems that carry flowing material, flow controls like valve assemblies (or "control valves" or "control valve assemblies") are vital to regulate material flow within set parameters or, in case of problems, shut-off flow altogether. In this regard, control valve assemblies may include a valve that couples in-line with the system to receive a flow of material. The valve may have components that move (e.g., translate, rotate, etc.) to restrict or permit this flow. An actuator often accompanies the valve. The actuator provides force necessary to cause this movement. Instruments are often necessary to operate the actuator. These instruments may reside as part of a panel or "control station" found at a location that is remote from the pipe or pipeline. This location permits an end user to access components that control, for example, pneumatics to energize (or de-energize) the actuator. At the same time, distance between the station and the actuator removes the end user from potential harm or hazardous conditions that may prevail at or near the actuator.

SUMMARY

The subject matter of this disclosure discusses improvements to these control stations. Of particular interest herein are embodiments with structure that simplifies construction to allow end users to flexibly arrange components together for operability. However, the proposed structure is robust enough to adapt to a particular installation or application and still meet rigorous performance demands.

DRAWINGS

Reference is now made briefly to the accompanying drawings, in which.

Figure 1:
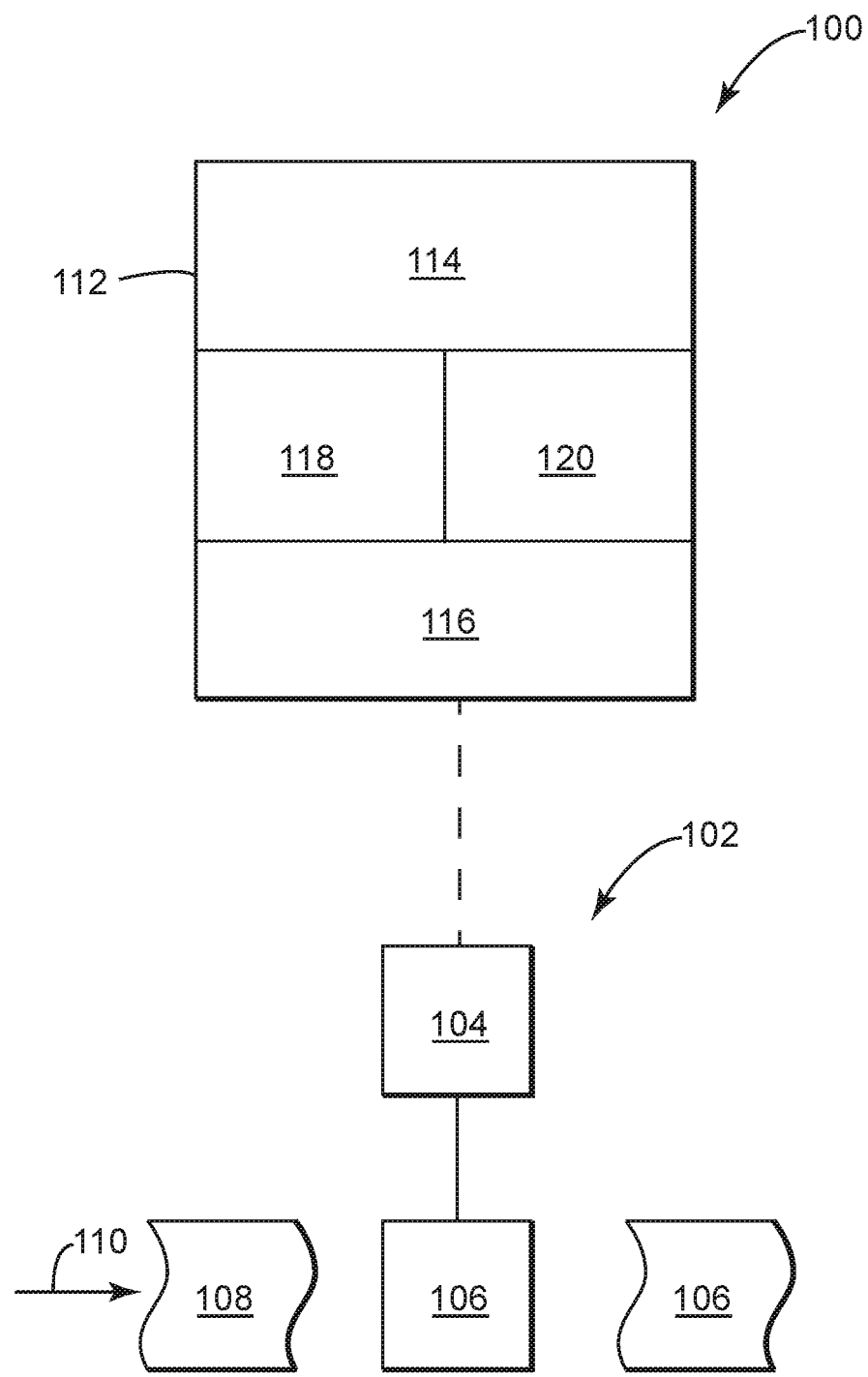
FIG. 1 depicts a schematic diagram of an exemplary embodiment of a control assembly to operate an actuator on a valve assembly.

Where applicable, like reference characters designate identical or corresponding components and units throughout the several views, which are not to scale unless otherwise indicated. The embodiments disclosed herein may include elements that appear in one or more of the several views or in combinations of the several views. Moreover, methods are exemplary only and may be modified by, for example, reordering, adding, removing, and/or altering the individual stages.

DETAILED DESCRIPTION

Opportunities to reduce costs of manufacture are welcome for products in nearly every industry. For heavy-duty valve assemblies, savings must balance with trade-offs in design that could compromise safety or performance. Changes in materials or construction, for example, undergo rigorous scrutiny to ensure that these valve assemblies still meet operational specifications. On the other hand, strategic decisions can address aspects of designs that go a long way to make the product less expensive, while at the same time offering something that is of the same or better quality to customers.

The discussion below describes embodiments of a control or instrument assembly for heavy-duty valve assemblies that adopts such strategic improvements. The embodiments may leverage structure that accommodates components, like air filters, pressure regulators, and shutoffs. These components outfit the assembly to operate effectively as a station for an end user (e.g., a technician) to access controls necessary to remotely operate an actuator that moves a corresponding valve. At least one advantage of the proposed design is to eliminate secondary processes (e.g., machining, welding, etc.) typical of activities necessary to complete assembly of these types of systems. This feature, in turn, reduces labor time and material costs to move the assembly from manufacture to installation at a customer site.

FIG. 1 schematically depicts an exemplary embodiment of a control assembly 100. The embodiment may operate a flow control, identified generally as by the arrow enumerated 102. Examples of the flow control 102 may include an actuator 104 that couples with a valve 106. The valve 106 may couple to a conduit 108 that carries material 110. The control assembly 100 may include an instrument panel 112 with control components 114. The instrument panel 112 may couple with a main support 116 that has a mounting substrate 118. A modular mounting system 120 may allow for replaceable attachment of the control components 114 to the mounting substrate 118.

Broadly, the embodiments simplify the control assembly 100. Practice to date often employs weldments that require secondary processing (e.g., drilling) to provide adequate measures to fasten items in position. These measures may utilize mounting holes that are pre-fabricated as part of a supplier-provided bracket that accompanies, for example, a filter or control handle assembly. The embodiments herein alleviate the need for these secondary processes, particularly as relates to mounting the control components 114.

The flow control 102 may be configured to regulate flow of material 110. These configurations may connect in-line with pipes or pipelines above or below ground. Hydrocarbon operations are known to leverage these devices to regulate flow of oil & natural gas from points of extraction to process facilities or, even, within the process facilities themselves. The flow often travels through the pipes at high pressure. So the flow control 102 needs to leverage components with robust construction. For example, the actuator 104 may embody a pneumatic device that can generate upwards of 800,000 in/lbs. This pneumatic device may couple with the valve 106 to change position of a closure component (e.g., a ball or disc) to restrict flow of the material 110. The closure component may reside in a casing with flanged ends that may mount to the conduit 108. Often, the flow control 102 may incorporate a spring or spring-loaded cartridge to allow for "spring-return" of the closure component as a fail-safe.

The instrument panel 112 may be configured to operate the actuator 104 to manage flow of material 110. These configurations may couple with the pneumatic device, as well as with other mechanics and electronics on the flow control 102. This feature permits active adjustment of the closure member where necessary, although static positioning of the closure member to maintain "regular" or "consistent" flow is often the norm. In this regard, the instrument panel 112 may use feedback from certain connections to monitor operation of the flow control 102. These connections may provide data, like temperature or pressure, which is pertinent to understand operation of the actuator 104 or components of the valve 106.

The control components 114 may be configured to outfit the instrument panel 112 for its control and monitor functions. These configurations may embody individual devices or combinations thereof. The devices can serve to regulate flow of operating fluids (e.g., gasses and liquids) to operate the pneumatic device. Others may serve to indicate status of these operating fluids, the valve 106, and the flow of material 110. Still other may serve to override operation of the actuator 104 or the valve 106, for example, in situations where loss of pressure of the operating fluid prevents appropriate positioning of the closure member.

The main support 116 may be configured to hold some or all of the devices that provide controls for the flow control 102. These configurations may embody a device, like a cabinet or stand. These devices may arrange as part of the flow control 102 or as stand-alone structure, for example, that can mount to a wall. This feature may locate the controls at or in proximity to the valve 106. Preference might also require that the main support 116 is in a location that is remote from the valve 106. This location may satisfy certain safety requirements, such as those that relate to hazardous areas. This feature may make the control components 114 readily accessible to an end user.

The mounting substrate 118 may be configured to reside in or on these devices. These configurations may leverage designs that avoid manufacture and assembly constraints that are typical of prior practices. Suitable designs may include pre-formed or fabricated pieces. These pieces may incorporate mounting features (e.g., holes, slots, apertures, etc.). This construction provides a standardized interface that is consistent from assembly to assembly and, moreover, independent of the type(s) of control components 114 that are necessary to operate the flow control 102.

The modular mounting system 120 may be configured to secure the control components 114 to this standardized interface. These configurations may also embody pre-formed or fabricated pieces, like brackets, hooks, and plates, to name a few. These pieces can connect directly to the control components 114 or, alternatively, secure to any corresponding mounting hardware for the same.

Figure 2:
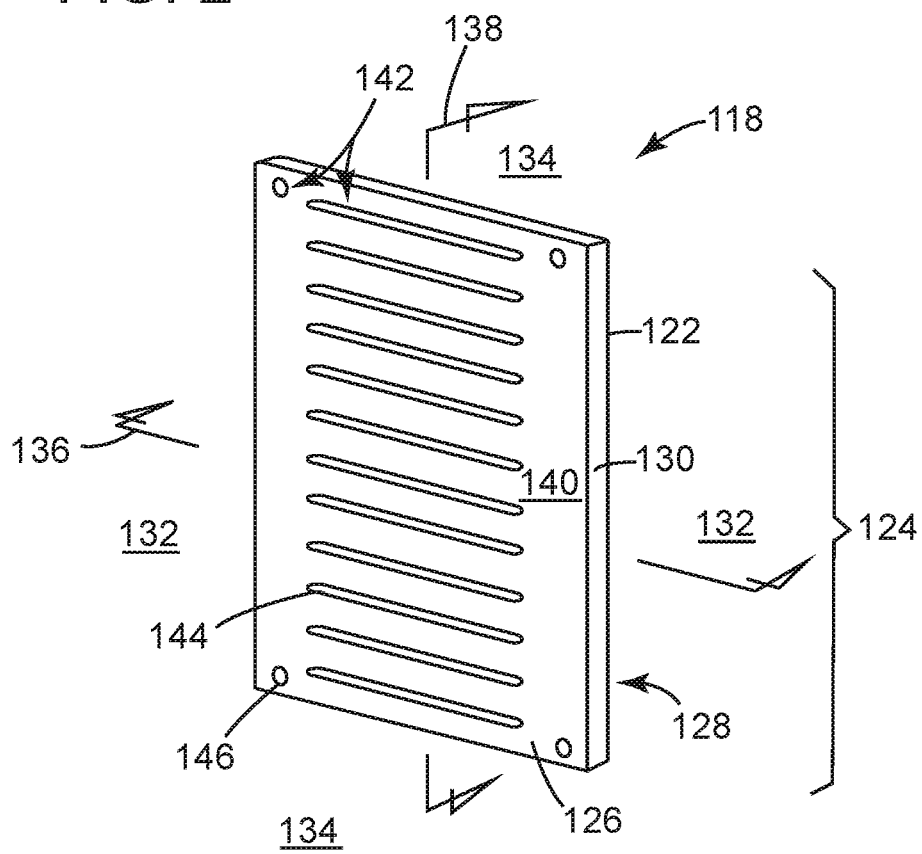
FIG. 2 depicts a perspective view of an example of a mounting substrate for use on the control assembly of FIG. 1.

FIG. 2 depicts a perspective view from the front of an example of the mounting substrate 118. This example embodies a thin plate 122 with a body 124 of robust construction, for example, made of metal or metal alloys (e.g., stainless steel). The body 124 may have flat, planar surfaces (e.g., a front surface 126 and a back surface 128) and an exterior, peripheral edge 130. Geometry for the body 124 may assume a shape that is rectangular or square. However, this disclosure contemplates other shapes (e.g., circular). The shape may result in two pairs of parallel sides (e.g., first pair 132 and a second pair 134) and bisecting planes 136, 138 therebetween. As also shown, the surfaces 126, 128 may form a mounting area 140 with one or more apertures 142. Examples of the apertures 142 may include assembly openings 144 and mounting openings 146.

The thin plate 122 may provide adequate support for control component 114. The piece or pieces of the body 124 should have mechanical properties, like stiffness, so that the control components 114 may hang or cantilever from surfaces 126, 128. Die or laser cut techniques may be useful to form the shape, as well as to perforate the body 124 with openings 144, 146 for ease of manufacture.

The assembly openings 144 can help simply assembly of the control assembly 100. Examples may embody elongate slots that penetrate through the material of the body 124. These slots may extend in a first direction, for example, between the sides 132, although the design may arrange the slots to extend between the sides 136 or at any angle to either of the sides 132, 134, as well. As also shown, the body 124 may include space or gaps may separate adjacent slots from one another in a second direction, which may be perpendicular to the first direction. This feature can populate the mounting area 140 with a plurality of the slots. In use, the modular mounting system 120 may couple with one or more of these slots to secure control components 114.

The mounting openings 146 may provide points of attachment for the body 124. These points may embody through-holes to receive bolts or screws. It may benefit the design for some of these holes to include threads, as well. In one implementation, these through-holes align with structure (e.g., openings, pins, fasteners) found on the mounting structure 118. When in position, this structure serves as point to attach or secure the body 124, thus providing a customizable interface on the mounting structure 118 to receive the control components 114.

Figure 3:
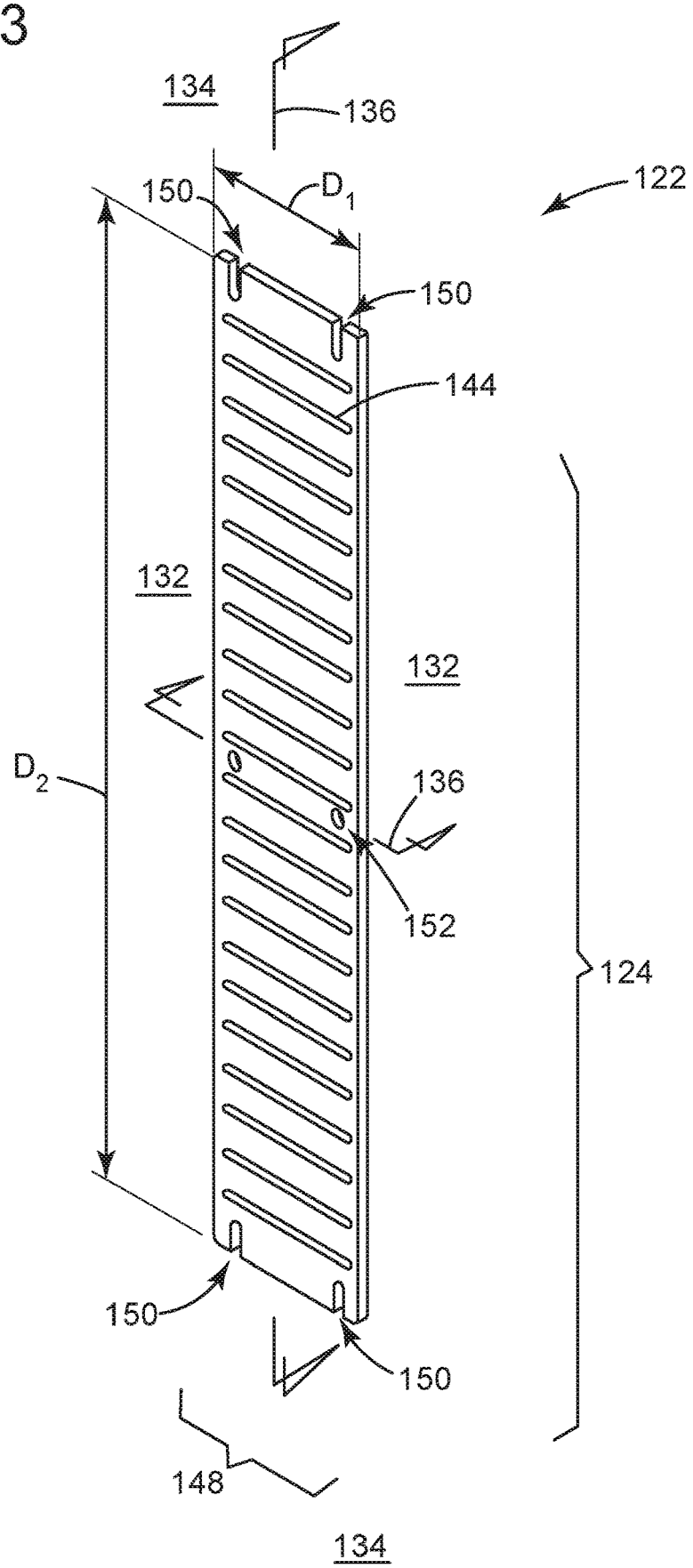
FIG. 3 depicts a perspective view of an example of the mounting substrate of FIG. 2.
Figure 4:
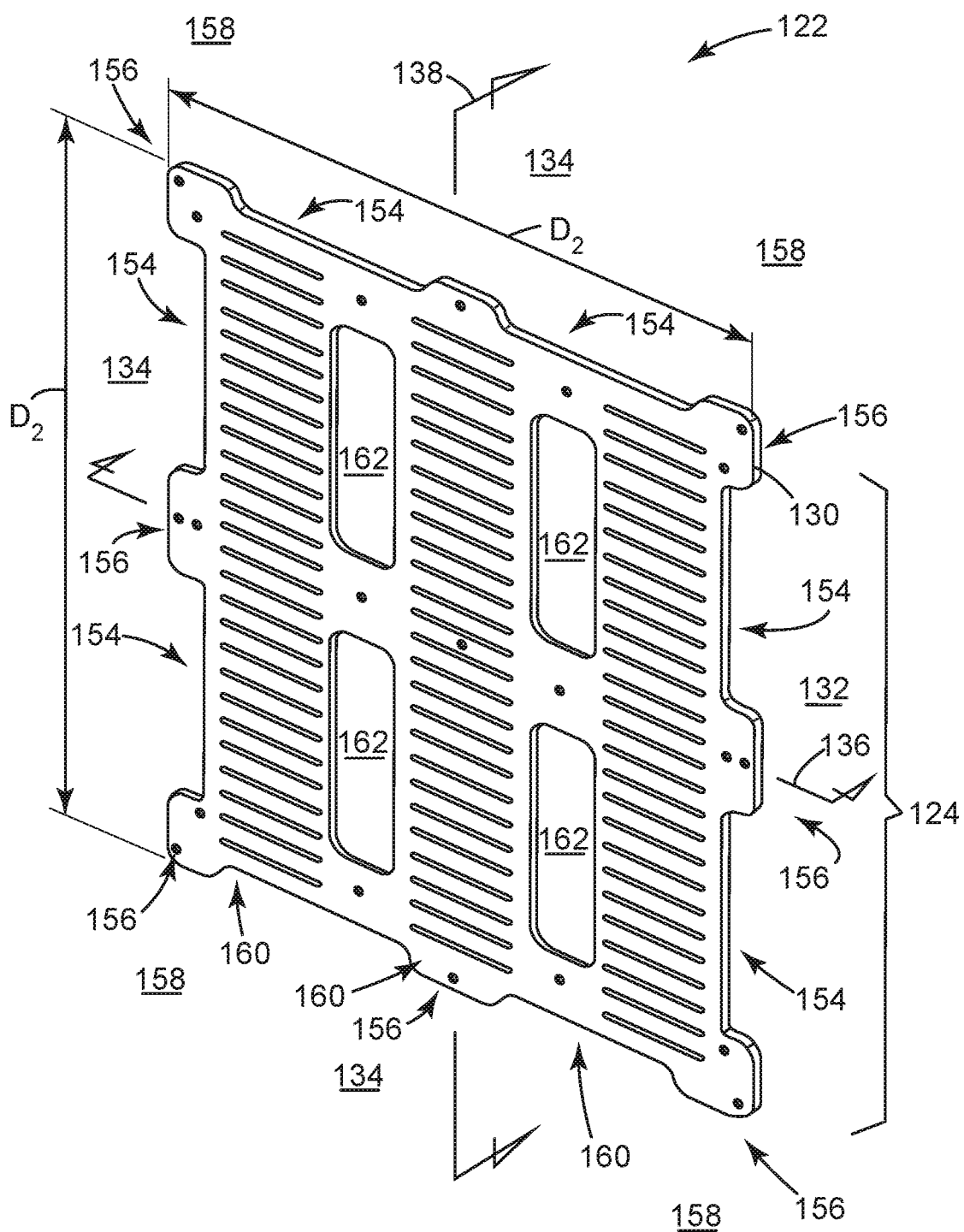
FIG. 4 depicts a perspective view of an example of the mounting substrate of FIG. 2.
Figure 5:
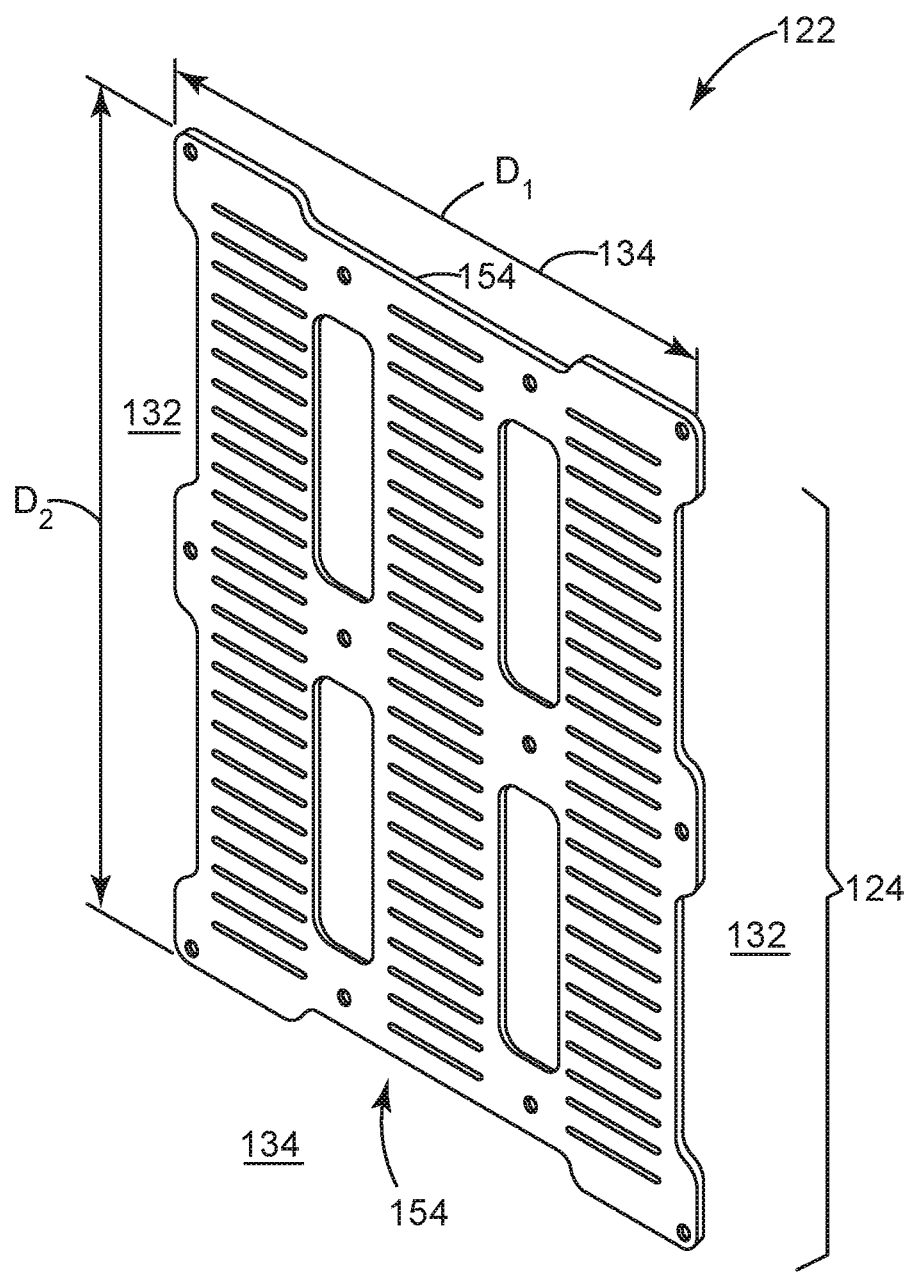
FIG. 5 depicts a perspective view of an example of the mounting substrate of FIG. 2.

FIGS. 3, 4, and 5 depict examples of the thin plate 122. These examples embody different configurations for the body 124. The configurations may adapt the mounting substrate 118 for use in the instrument panel 112, for example, with variations in some features including one or more dimensions ($D_1$, $D_2$) for the body 124 or dimensions or locations for the openings 144, 146, among others. FIG. 3 depicts the body 124 with dimension $D_1$ set to form a thin strip 148. This example also incorporates open-ended slots 150 that penetrate from the sides 134 toward the bisecting plane 138. Through-holes 152 may align on the bisecting plane 136. Both the slots 150 and the holes 152 may set in from the sides 132 toward the bisecting plane 136. FIG. 4 shows the body 124 with cut-outs 154 that populate the peripheral edge 130. The cut-outs 154 may create flange members 156. Examples of the flange members 156 may reside at corners 158 and on the sides 132, 134, for example, at or near bisecting planes 136, 138. The length of the elongate slots 144 may allow for a plurality of arrays 160, shown here spaced apart from one another across the mounting area 140. Openings 162 may populate space between adjacent arrays 158. The openings 162 may serve to reduce weight of the plate 122. As best shown in FIG. 5, dimension $D_1$ may reduce the size of the body 124 to fit only one cut-out 154 on the sides 134.

Figure 6:
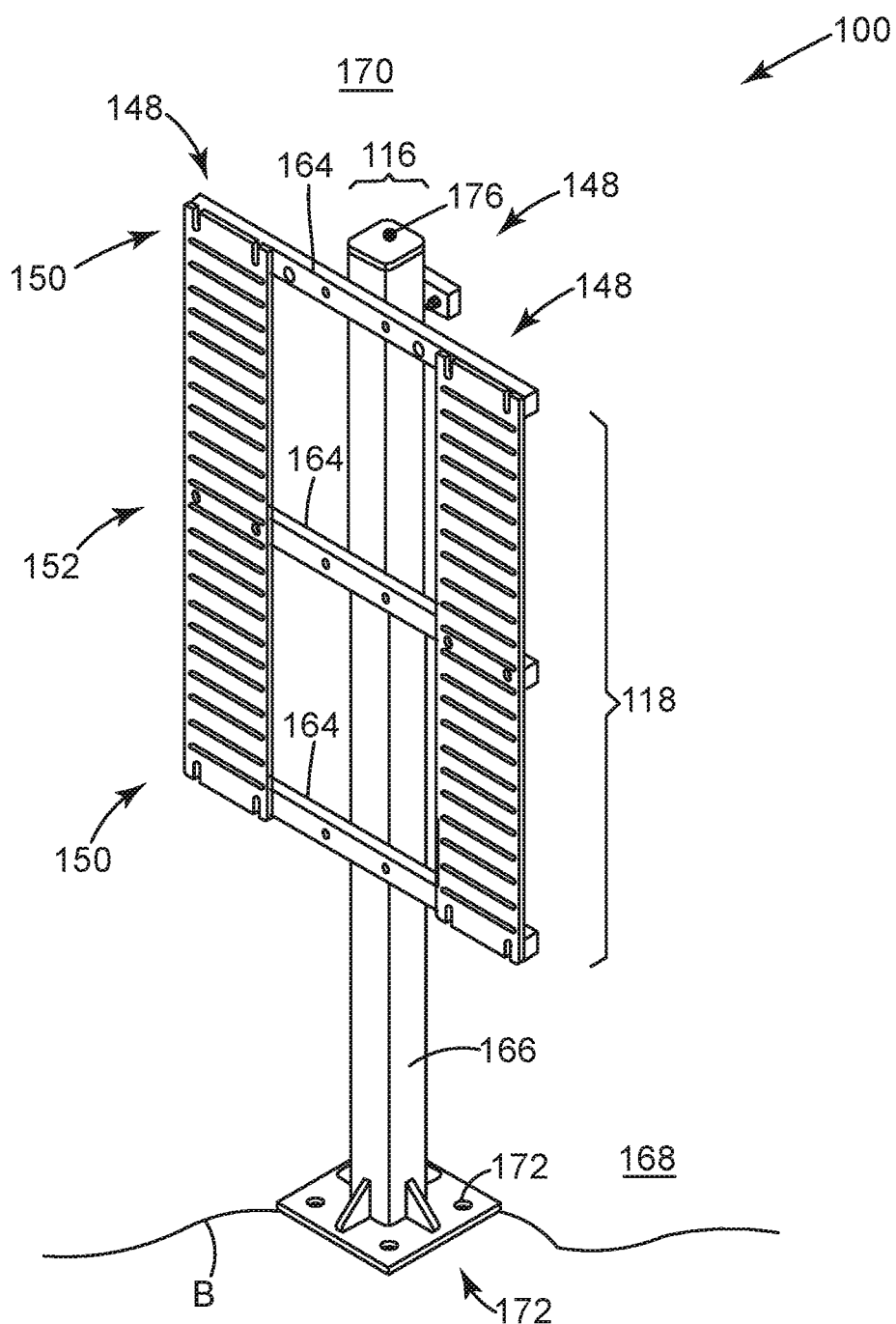
FIG. 6 depicts a perspective view of an example of a support structure for use on the control valve assembly of FIG. 1.
Figure 7:
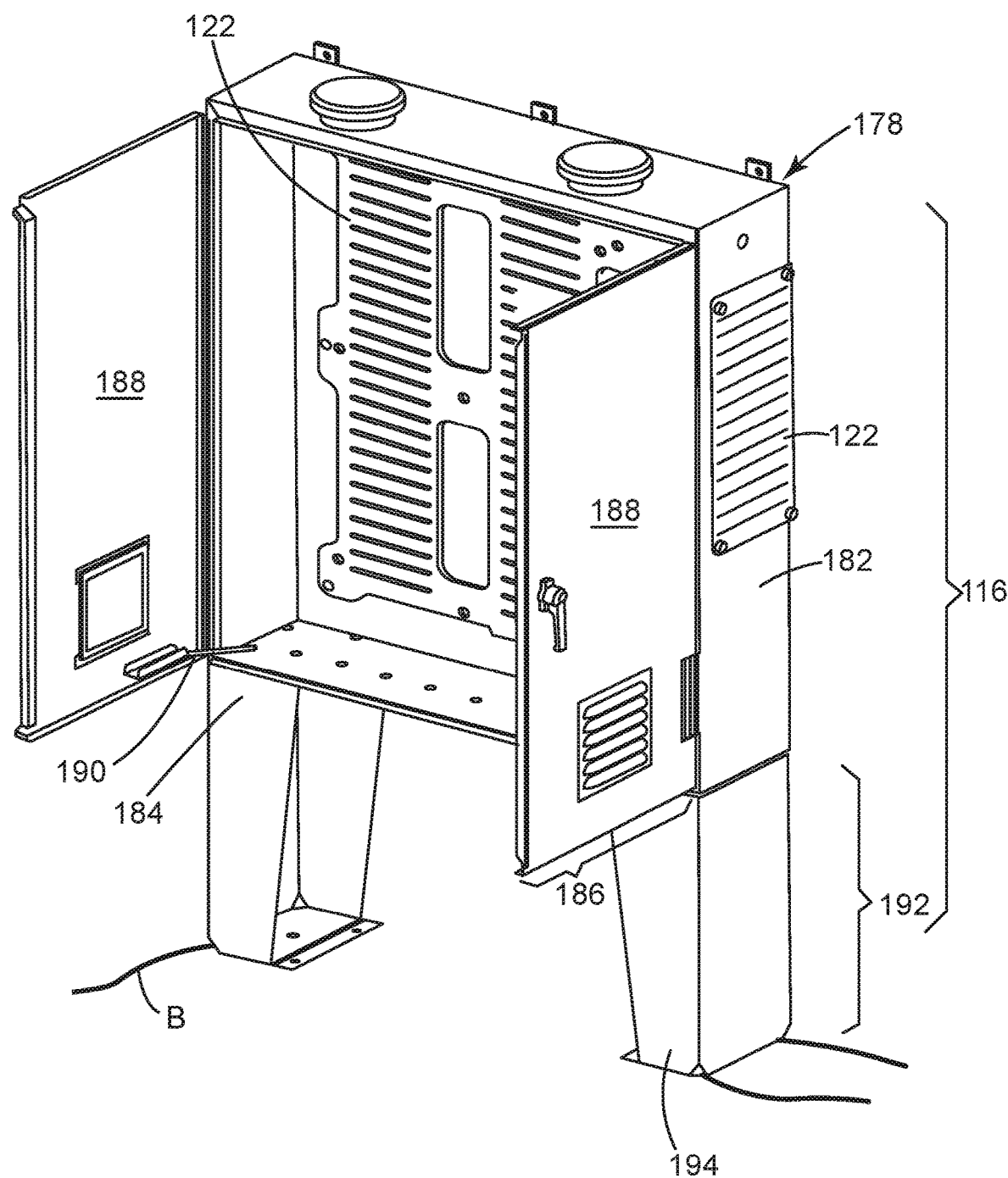
FIG. 7 depicts a perspective view of an example of a support structure for use on the control valve assembly of FIG. 1.

FIGS. 6 and 7 depict perspective views of exemplary structure for the main support 116 of the control assembly 100. This structure provides appropriate physical support, access, protection, or security to the control components 114. When installed, the structure may locate in myriad locations, including as an above-ground part of the flow control 102 or part of other control components that may work to control the flow control 102 or process or pipeline at the facility.

FIG. 6 shows the main support 116 configured as an open-air support. This configuration may include mounting brackets 164, for example, metal bar stock or tube. These pieces may secure to an elongate member 166 with ends (e.g., a first end 168 and a second ends 170). Steel or metal tubes may operate as the elongate member 166 in many designs. Fasteners or welding are two techniques to secure the mounting brackets 164 in position, but other techniques are not excluded from this disclosure. On the first end 168, the elongate member 166 may have a flange 172 with openings 174. The flange 172 may secure to a base B, like a concrete pedestal. In one implementation, the base B may incorporate part of the flow control 102 (FIG. 1), for example, part that remains exposed on sub-surface valve assemblies. Bolts and like fasteners may penetrate the openings 172 to make appropriate connections with the base B. On the second end 170, the elongate member 166 may benefit from a receiving member 176, for example, a robust eyelet or hook. This component may operate as a location of connection for a hoist or elevator device to engage in order to lift the control assembly 100 for transport between locations, for example, from a cargo container or pallet.

The mounting brackets 164 may support one or more of the plates 122. Threaded or unthreaded holes may populate the brackets 164 to receive fasteners that secure the plates 122, shown here as strips 148. The fasteners may penetrate through slots 150 and through-holes 152 into the corresponding threaded or unthreaded holes in the mounting brackets 164. Multiple holes on the brackets 164 may allow for variations in the position of the strips 148. In one implementation, two of the strips 148 are show on the "front" and one on the "back" of the control assembly 100. But the design may accommodate more or less as necessary, for example, by increasing or decreasing the length of the brackets 164.

FIG. 7 shows the main support 116 configured to enclose the control components 114. This configuration may embody a cabinet 178 with a peripheral wall 180, typically sheet metal that is fabricated to form a "box" with sides 182 and an open front 184. One of the plates 122 may affix to the sides 182 inside of the box. Additional plates 122 may also mount to the sides 182 on the outside of the box, as well. This configuration may include mechanics 186 to regulate access to the inside of the box. The mechanics 186 may include one or more door members 188 that affix to the sides 182 via a hinge 190. Other mechanisms (e.g., sliders, rollers, etc.) may be used in place of the hinge 190 as well. As also shown, the cabinet 178 may reside on legs 192. Construction for the legs 192 may also comprise bent metal. This construction may include feet 194 to adapt the legs 192 to secure to the base B.

Figure 8:
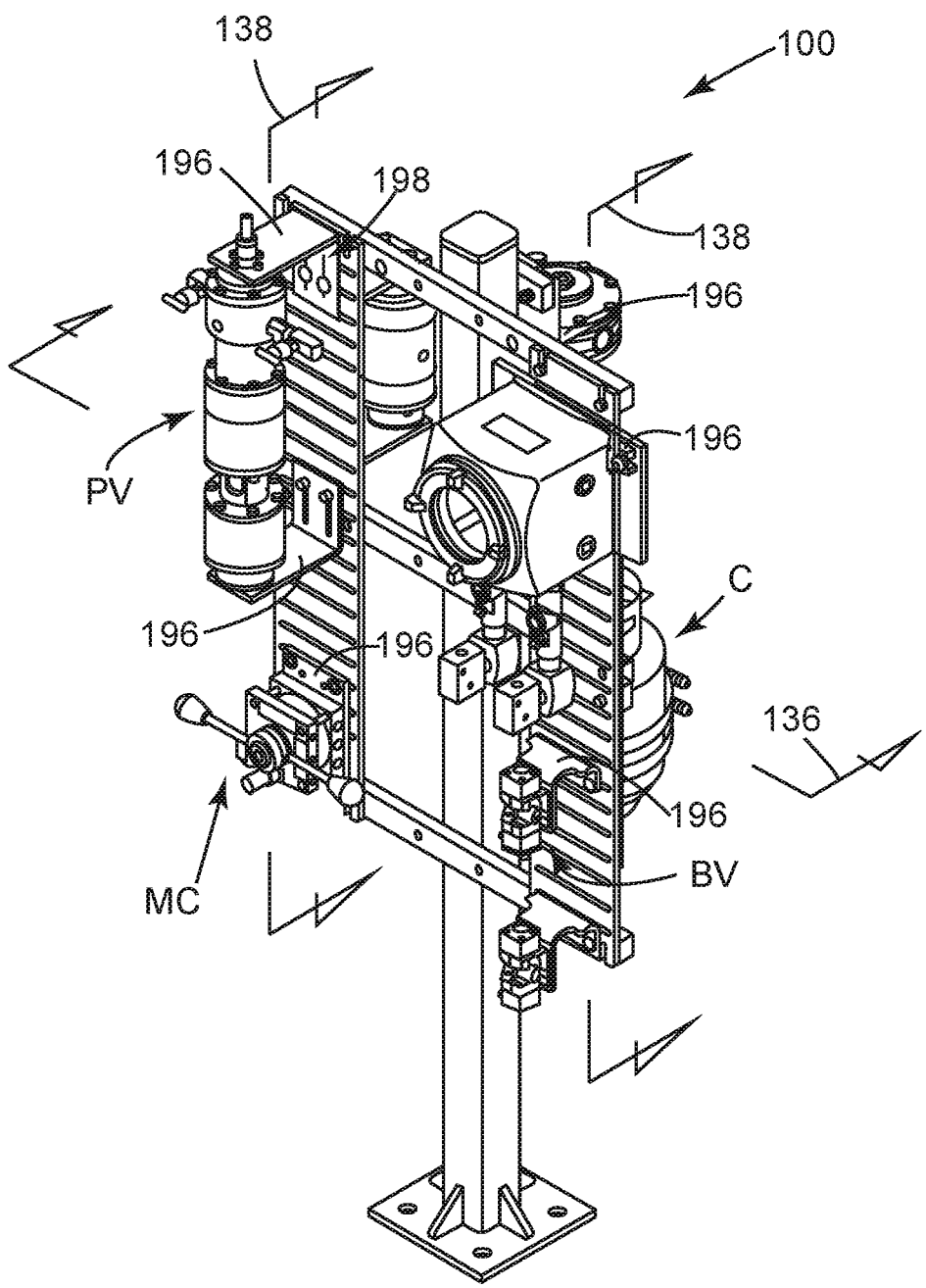
FIG. 8 depicts a perspective view of examples of control components shown mounted to the support structure of FIG. 6 for use on the control valve assembly of FIG. 1.
Figure 9:
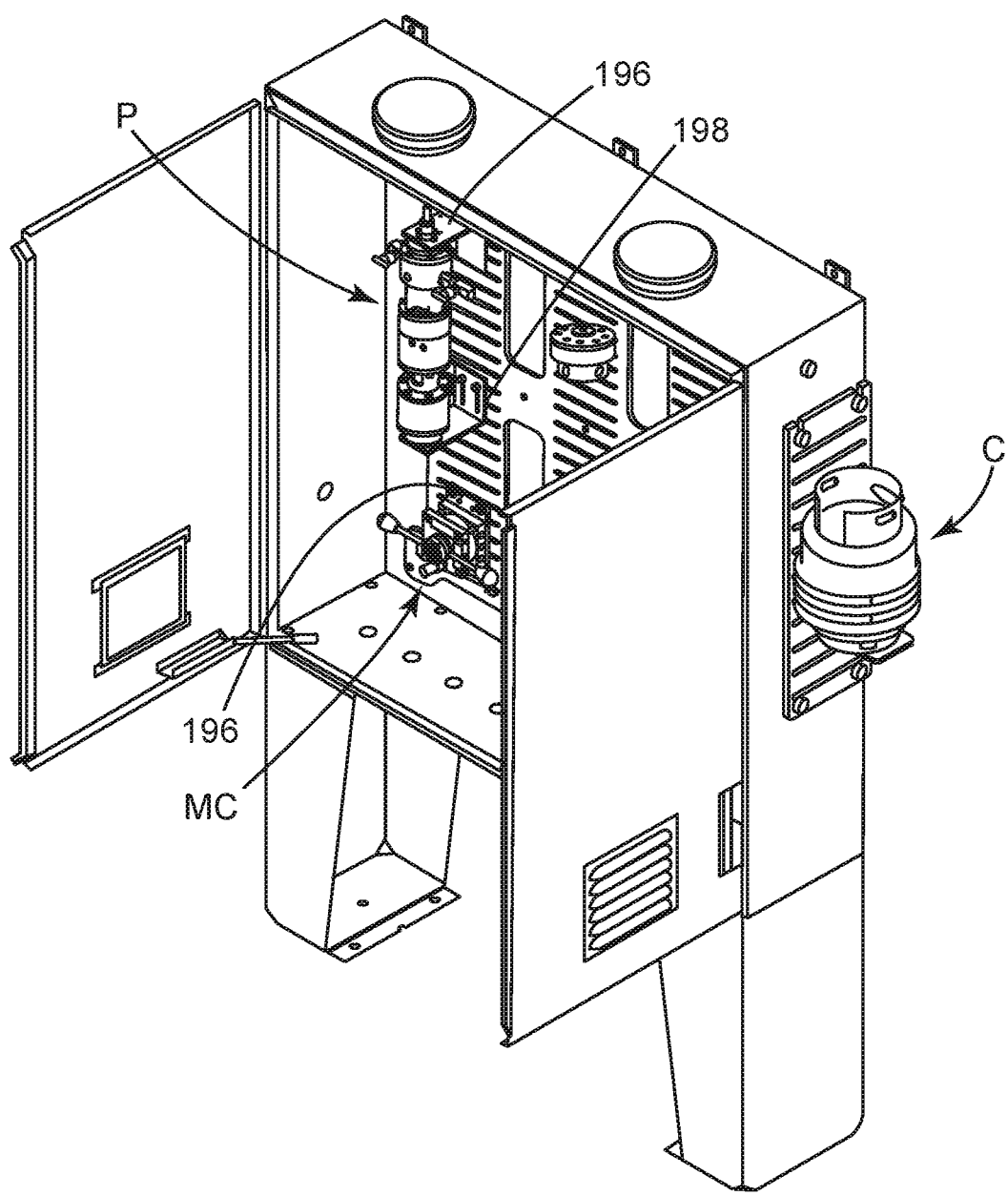
FIG. 9 depicts a perspective view of examples of control components shown mounted to the support structure of FIG. 6.

FIGS. 8 and 9 depict perspective views of examples of the control assembly 100. The mounting modular mounting system 120 may include mounting members 196. Examples of the mounting members 196 may be thin, elongate plates, metal blocks of various shapes (e.g., square, rectangular, circular, etc.), or bent metal brackets (e.g., L-brackets). These components may include one or more apertures 198 that penetrate the material. In use, the apertures 198 may align with one or more of the slots 144 when the members 196 are brought in abutment with the mounting substrate 118. Fasteners including nuts and bolts may, in turn, provide secure engagement of the mounting members 196 so as to position control components 116 for use in the control assembly 100. The control components 116 may include pilot valves (PV), manual controls (MC), bleed valves (BV), and canisters (C). But other devices may find use in the control assembly 100 and, thus, leverage the construction of the mounting members 196. At least one benefit of this design is to allow for variations in the position of these components relative to, for example, bisecting planes 136, 138. The mounting member 196 can secure to different slots 144 on the mounting substrate 118. Likewise, it is possible for an end user to loosen the fasteners enough to slide the bracket 196 from a first position along the slots 198 to a second position, and then tighten the fasteners to maintain the second position. This new position may permit the end user to secure additional components without the need for re-work or other secondary processes to the parts of the control assembly 100.

In light of the foregoing discussion, this disclosure describes improvements to control structure for heavy duty actuators. These improvements provide structure to facilitate final assembly of control stations. This structure affords more flexibility in design and integration of control components, while at the same time avoiding post fabrication machining and other processes that can add costs in parts and labor to the overall manufactured product.

This written description uses examples to disclose the invention, including the best mode, and also to enable any person skilled in the art to practice the invention, including making and using any devices or systems and performing any incorporated methods. An element or function recited in the singular and proceeded with the word "a" or "an" should be understood as not excluding plural said elements or functions, unless such exclusion is explicitly recited. References to "one embodiment" of the claimed invention should not be interpreted as excluding the existence of additional embodiments that also incorporate the recited features. Furthermore, the claims are but some examples that define the patentable scope of the invention. This scope may include and contemplate other examples that occur to those skilled in the art. Such other examples are intended to be within the scope of the claims if they have structural elements that do not differ from the literal language of the claims, or if they include equivalent structural elements with insubstantial differences from the literal language of the claims.

Examples appear below that include certain elements or clauses one or more of which may be combined with other elements and clauses describe embodiments contemplated within the scope and spirit of this disclosure.

What is claimed is:

1. An apparatus, comprising:
   a flow control; and a control assembly coupled with the flow control, the control assembly comprising a vertical main support comprising an elongate tube with a bottom end that is mountable to a base and a thin plate disposed on the main support and spaced vertically above the base, the thin plate having four sides forming a mounting surface, wherein the mounting surface is parallel to the elongate tube and perpendicular to the base, the thin plate also having lateral slots that extend lengthwise in a first direction between two of the sides and are arranged so adjacent lateral slots are spaced apart from one another in a second direction perpendicular to the first direction, wherein the thin plate comprises cutouts on each of the four sides.

2. The apparatus of claim 1, wherein the thin plate comprises cutouts in the mounting surface that are spaced inwardly from each of the sides, wherein the cutouts populate space on the thin plate proximate each of the four sides.

3. The apparatus of claim 1, wherein the lateral slots are formed into a first set and a second set so that lateral slots in the first set are spaced apart from lateral slots in the second set along the first direction.

4. The apparatus of claim 3, wherein openings penetrate the thin plate between the first set and the second set.

5. The apparatus of claim 1, wherein the control assembly connects pneumatically to the flow control.

6. The apparatus of claim 1, wherein the the bottom end is flanged.

7. The apparatus of claim 6, further comprising:
mounting brackets to receive the thin plate, wherein the mounting brackets secure to the elongate tube.

8. An apparatus, comprising:
a flow control; and
a control assembly coupled with the flow control, the control assembly comprising a vertical main support comprising an elongate tube with a bottom end that is mountable to a base and a thin plate disposed on the main support and spaced vertically above the base, the thin plate having four sides forming a mounting surface, wherein the mounting surface is parallel to the elongate tube and perpendicular to the base, the thin plate also having lateral slots that extend lengthwise in a first direction between two of the sides and are arranged so adjacent lateral slots are spaced apart from one another in a second direction perpendicular to the first direction,
wherein the thin plate comprises cutouts on each of the four sides to form flange members on each of the four sides that align with a plane bisecting the thin plate.

9. The apparatus of claim 8, wherein the thin plate comprises cutouts in the mounting surface that are spaced inwardly from each of the sides, wherein the cutouts populate space on the thin plate proximate each of the four sides.

10. The apparatus of claim 8, wherein the lateral slots are formed into a first set and a second set so that lateral slots in the first set are spaced apart from lateral slots in the second set along the first direction.

11. A system, comprising:
a flow control having a valve and a pneumatic actuator;
pneumatic control components coupled with the pneumatic actuator;
an elongate tube with a bottom end that is mountable to a base; and
one or more thin, metal plates attached to the elongate tube and supporting the pneumatic control components, the thin, metal plates having elongate elliptical slots, the elongate elliptical slots forming first openings with a length extending in a first direction on the thin, metal plate that is perpendicular to the elongate tube, the first openings spaced apart from one another on the thin, metal plate in a second direction that is perpendicular to the first direction.

12. The system of claim 11, further comprising:
bent, metal brackets that couple to the pneumatic control components, the bent, metal brackets having openings that align with the first openings of the elongate slots.

13. The system of claim 11, wherein the one or more thin, metal plates comprise a first plate and a second plate spaced apart from the first plate.

14. The system of claim 13, wherein the one or more thin, metal plates comprise a third plate spaced apart from the first plate and the second plate.

15. The system of claim 11, wherein
the bottom end of the elongate tube is flanged.

16. The system of claim 15, further comprising:
mounting brackets that interpose between the one or more thin, metal plates and the elongate tube.

17. The system of claim 11, wherein the one or more thin, metal plates comprises a first plate with four sides, the four sides with cutouts to form flange members on each of the four sides that align with a plane bisecting the thin plate.

18. The system of claim 11, wherein the one or more thin, metal plates comprises a first plate forming a mounting surface and with cutouts in the mounting surface that are spaced inwardly from each of the sides, wherein the cutouts populate space on the first plate proximate each of the four sides.

19. The system of claim 11, wherein lateral slots are formed into a first set and a second set so that lateral slots in the first set are spaced apart from lateral slots in the second set along the first direction.

20. The system of claim 19, wherein second openings penetrate the thin plate between the first set and the second set.

* * * * *